J. B. BARTHOLOMEW.
AUTOMOBILE.
APPLICATION FILED JUNE 30, 1903.
973,251.
Patented Oct. 18, 1910.
2 SHEETS—SHEET 1.
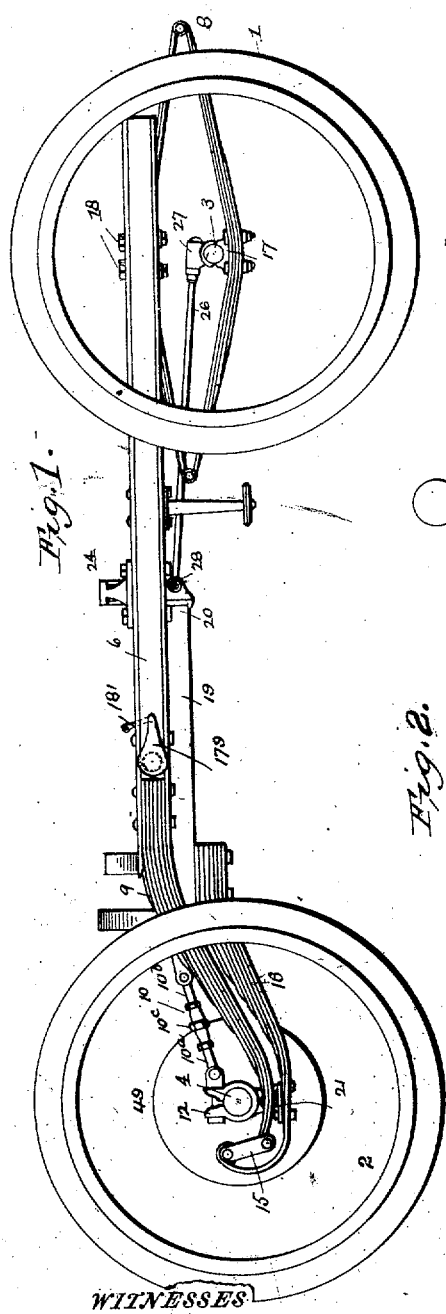
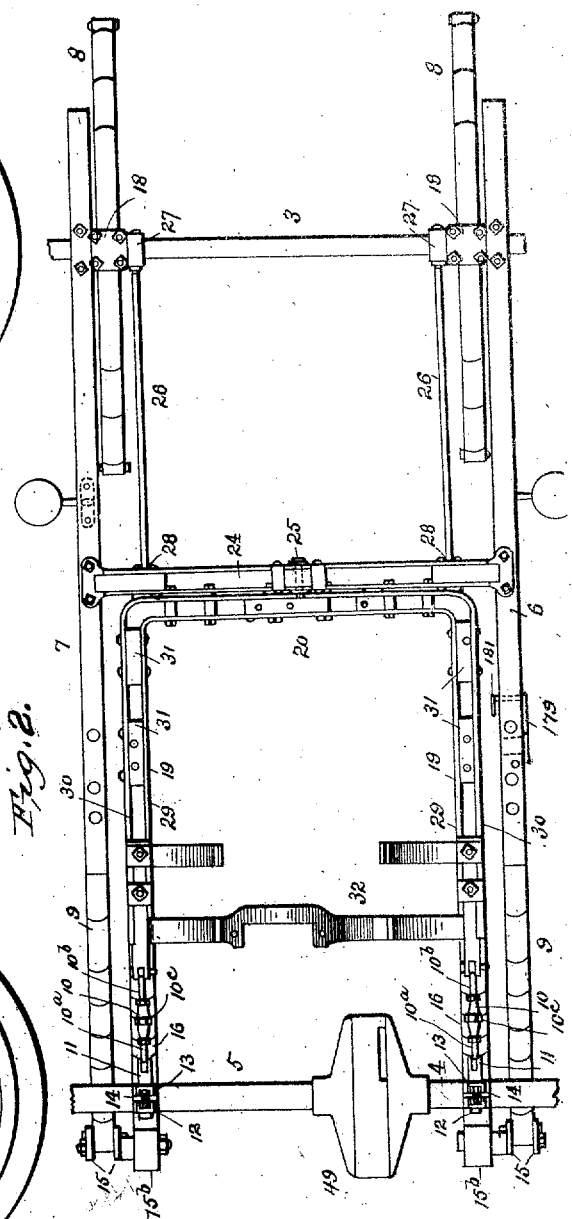
WITNESSES
Edwin L. Yewell
INVENTOR
John B. Bartholomew
H. H. Bliss
Attorney

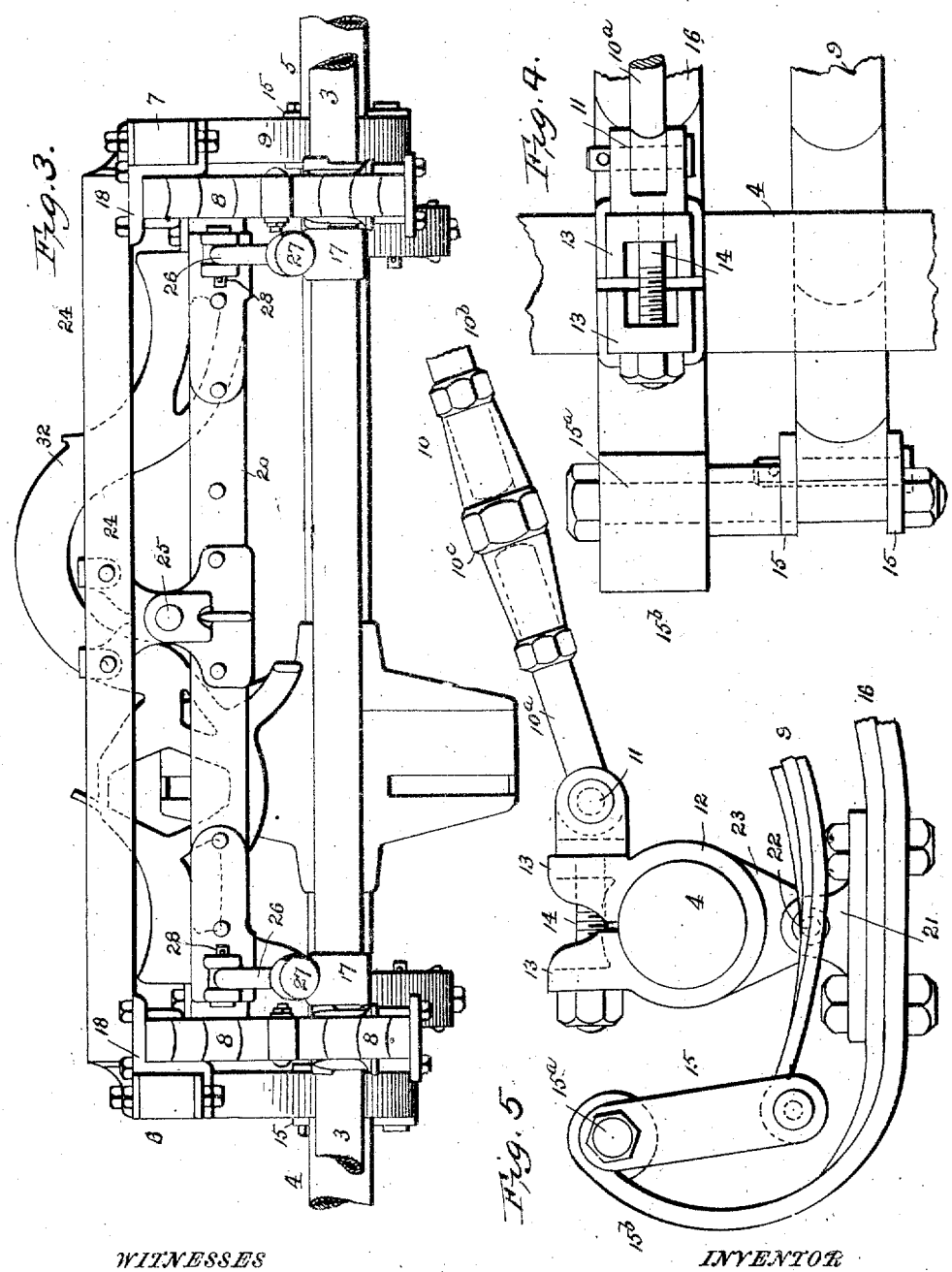

UNITED STATES PATENT OFFICE.

JOHN B. BARTHOLOMEW, OF PEORIA, ILLINOIS.

AUTOMOBILE.

973,251.  Specification of Letters Patent.  Patented Oct. 18, 1910.

Application filed June 30, 1903. Serial No. 163,758.

*To all whom it may concern:*

Be it known that I, JOHN B. BARTHOLOMEW, a citizen of the United States, residing at Peoria, in the county of Peoria and State of Illinois, have invented certain new and useful Improvements in Automobiles, of which the following is a specification, reference being had therein to the accompanying drawing.

This invention relates to running gears for motor vehicles and has for its object the provision of such a running gear comprising a main or body frame and an engine or motor frame, the two so related and connected as to obviate numerous difficulties that have been encountered in motor vehicle constructions.

In the accompanying drawings which illustrate a practical embodiment of my invention—Figure 1 is a side view of the running gear and engine-supporting frame. Fig. 2 is a top plan view of the same. Fig. 3 is a front elevation of a part of the devices shown in Figs. 1 and 2. Figs. 4 and 5 are enlarged views showing details of the running gear.

In the drawings the running gear of the vehicle is shown as provided with the front wheels 1, 1, and the rear wheels 2, 2, the former carried by the front axle 3, to which they are connected by steering knuckles, and the latter connected to the divided rear axle 4, 5.

The axles are held parallel to each other, and more or less rigidly by means of the gear frame which comprises the side bars 6, 7, the front elliptic springs 8, 8, interposed between the frame bars, and the front axle, and springs 9, 9, interposed between them and the rear axle. At the rear ends the springs 9 are suspended in swinging links 15, which are pivotally connected at 15$^a$ to upwardly turned arms 15$^b$, in turn connected to the rear axle 4, 5, and preferably provided by extending one of the leaves of each of two supplemental springs 16, 16, to be described.

At the front ends the elliptic springs 8, 8, are connected to the side bars 6, 7, by means of clamp plates 18, 18, and at the bottom these springs are connected to the front axle by fastening clips or brackets 17.

Within the wheel frame above referred to, there is arranged an engine frame, having side parts 19, 19, across connected parts 20. The rear ends of the side parts 19, 19, are joined to the springs 16, 16, which extend backward, and have their rear ends situated under the rear axle housing 4, 5, being flexibly or pivotally connected thereto by means of a friction gripping clamp as 12, having a depending ear or plate 23, to which at 22, is pivoted the lug 21, of the fastening device at the rear end of the spring 16. The clamp 12 is held firmly to the axle housing by means of a bolt 14, which draws together the two ears or projections 13 of the clamp. This part of the frame work is stayed by means of the link devices at 10, 10, pivotally connected at their upper ends to the side part 19, 19, of the engine frame, and pivotally connected at 11 to the axle clamp, the heads of the bolts 14, being preferably formed with ears to receive the pivots. These bracing or staying devices are adjustable, there being two parts, 10$^a$ and 10$^b$ of each link, and the adjacent parts being oppositely threaded, and provided with a correspondingly threaded nut-like connecting device 10$^c$. By adjusting this nut 10$^c$ the rear axle may be moved backward or forward to vary the tension on the driving chain, such movement of the axle being permitted by the pivotal connection at 22.

The engine frame having the parts just described is connected to the wheel frame, or gear frame, by means of a longitudinal hinge at 25, joining this frame to a cross bar, or bars, at 24, carried by the wheel frame. It is also connected to the latter frame by means of stay rods 26, 26, which at their forward ends are connected to the clamps 27, secured to the front axle 3, and at their rear ends pivoted as at 28, 28, to the front cross part 20 of the engine frame.

The side parts 19, and the cross parts of the engine frame, I prefer to make in the way shown, that is to say, with bent bars of strap metal at 29, 30, spaced and braced by blocks 31, the latter also furnishing supports for a number of the parts that have to be secured to this frame. 32 is a supplemental cross bar on the engine frame which supports the rear part of the engine and certain auxiliary parts.

When the parts of each of the frames are constructed and related in the way described, it will be seen that there is, in effect, a universal and automatic adjustment of the two frames in relation to each other; that is to say, that the wheel frame, or body frame, can be subjected to lateral torsion and twisting to a considerable extent, without affecting the position of the engine frame, and the parts supported thereby, and vice versa, the latter can have shocks and jars imparted to it without their being transmitted to the body frame or the wheel frame.

It is well known that a large part of the power of the engine in vehicles of this class is wasted because of its being expended upon the body springs, and because of the displacement of the various parts of the engine at each rise and fall of any of the wheels, such as are frequently experienced even in traveling on ordinary roads. Even the lateral tilting of the fly-wheels when rapidly rotating is a serious impediment to the proper action of the parts. In the present case, one or more of the wheels can suddenly drop below, or rise above, the normal level of the bottom points of the wheel peripheries, without affecting the proper movement of the engine. In this connection, it is noted that the links 26, 26, while acting effectively as struts between the front axle and engine frame, do not interfere with the torsion of the running gear frame or body frame in relation to the engine frame. Another cause of discomfort and inconvenience in the use of such vehicles of this class, is the constant throbbing, or pounding, that is transmitted from the crank shaft to the body frame and the wheel frame, this being especially true where the engine parts and the body parts are supported upon a common spring frame. Here, the body and the driver supported thereby have their weight carried by one set of frame parts and springs and the engine, and the power transmitting devices are supported upon another set of frame parts and springs largely independent of those which carry the weight of the body.

Should the two front wheels, or the two rear wheels, or all four, suddenly rise or fall, the inertia effect of the heavy parts of the engine and power transmitting devices is largely overcome, the latter being allowed to retain their positions as to horizontal planes until the running gear and body frame are restored to their proper positions, because of the independence of the frames and the peculiar means of connecting these to the rear axle. In case the engine frame and the running gear frame should thus be vertically moved relative to each other, the links 15 and the hinges 22 allow great freedom. When such relative movement is occurring the link connections at 10 act either as struts or ties, according as the rear axle is rising or falling, and tend to rock the axle housing 4, 5, bodily and this is permitted by the hinged parts at 21, 23, which also accommodate the backward and forward movements of the rear ends of the springs 16. During such movements of the parts the links 15 prevent the transfer to the body frame of shocks or strains.

What I claim is:

1. In a motor vehicle, the combination of front and rear axles, a body frame resting upon the axles, an engine or motor frame, means independent of the axles connecting the engine frame to the body frame, and means independent of the body frame connecting the engine frame to the axles, said connections between the engine frame and the body frame and axles respectively being flexible, whereby the body frame and axles may rock or vibrate independently of the engine frame.

2. In a motor vehicle, the combination of the front and rear axles, a body frame resting upon the axles, an engine or motor frame flexibly connected to the body frame at a point between the axles, flexible devices connecting said engine frame to one of the axles so as to permit it to yield vertically relatively to said axle, and flexible devices connecting the engine frame to the other axle so as to permit it to rock around an axis longitudinal of the vehicle.

3. In a vehicle of the class described, the combination of the axles, the engine frame, springs interposed between the engine frame and one of the axles, the connecting bars connecting the engine frame to the other axle, and the body frame connected to the axles independently of the engine frame, and also connected to the engine frame, substantially as set forth.

4. In a vehicle of the class described, the combination with the axles, the engine frame, the springs interposed between one end of the engine frame and one of the axles, a bar or rod connecting the other end of the engine frame to the other axle and adapted to rock at one end upon a transverse axis and to rock at the other end about the axis of the axle, substantially as set forth.

5. In a vehicle of the class described, the combination of the axles, the body frame supported on said axles, the engine frame, the springs interposed between the engine frame and one of the axles, and a bar or rod transversely hinged at one end to the engine frame and secured at its other end to the other axle, substantially as set forth.

6. In a vehicle of the class described, the combination of the engine frame resiliently mounted on one of the axles, the bar or rod hinged to the engine frame on a transverse axis and secured to the other axle, and the body frame connected to the axles and flexibly connected at a point between the axles to the engine frame, substantially as set forth.

7. In a vehicle of the class described, the combination of the axles, the engine frame yieldably connected to the axles, and the body frame connected to the axles independently of the engine frame, said frames being directly connected together at a point between the axles and adapted to vibrate relatively to each other around an axis longitudinally of the vehicle.

8. In a vehicle of the class described, the combination of the axles, the engine frame yieldably connected to the axles, the body frame connected to the axles independently of the engine frame, and means flexibly connecting said frames directly together to permit each side part of each frame to vibrate independently of the other frame, substantially as set forth.

9. In a vehicle of the class described, the combination of the axles, the engine frame, and the body frame, each of said frames being resiliently mounted independently of the other upon one of the axles and the engine frame being pivotally connected on a longitudinal axis to the body frame, substantially as set forth.

10. In a vehicle of the class described, the combination of the axles, the engine frame, the body frame, springs interposed between each frame and a common axle and entirely independent of each other, and said frames being flexibly connected together, whereby either side of either frame can vibrate vertically independently of the other frame, substantially as set forth.

11. In a vehicle of the class described, the combination of the axles, the engine frame, the body frame mounted upon each axle, springs interposed between the engine frame and one of the axles, rods or bars flexibly connecting the engine frame with the other axle, and means for flexibly connecting the engine frame to the body frame.

12. In a vehicle of the class described, the combination of the axles, the engine frame adapted to support an engine and power transmitting devices connecting the engine and one of the axles, springs interposed between the engine frame and said axle, a bar or rod flexibly connecting the engine frame to the other axle, and a body frame spring mounted on both axles and flexibly connected to the engine frame substantially as set forth.

13. In a vehicle of the class described, the combination of the axles, the engine frame, the body frame mounted on the axles, springs interposed between the body frame and one of the axles, springs interposed between the body frame and the other axle, the engine frame, means for connecting the engine frame to one of the axles, and a bar or rod connecting the engine frame with the other axle and adapted to transmit stress from the engine frame through the last said axle to the spring that supports the body frame thereon, substantially as set forth.

14. In a vehicle of the class described, the combination of the axles, the body frame connected to the axles and having a cross bar lying between the axles, the engine frame inside of the body frame flexibly connected to the cross bar of said body frame by a longitudinal hinge, and springs interposed between the engine frame and one of the axles.

15. In a vehicle of the class described, the combination of the axles, the body frame supported on the axles, the engine frame connected to the body frame by a longitudinal hinge, the rods or bars flexibly connected to the engine frame one on each side of said hinge and each connected to one of the axles, and springs interposed between the engine frame and the other axle, substantially as set forth.

16. In a vehicle of the class described, the combination of the axles, the body frame supported on the axles and having a cross bar which lies between the axles, the engine frame pivotally connected to the body frame, the bars or rods situated below the said cross bar and flexibly connected to the engine frame and also connected to one of the axles, and means for supporting the engine frame on the other axle, substantially as set forth.

17. In a vehicle of the class described, the combination of the axles, the body frame, the elliptic springs interposed between the body frame and one of the axles, the quarter elliptic springs interposed between the body frame and the other axle, the engine frame, the quarter elliptic springs connecting the engine frame to the last said axle, and the bars or rods connecting the engine frame to the first aforesaid axle, and means for flexibly connecting the frames at points between the axles, substantially as set forth.

18. In a vehicle of the class described, the combination of the axles, the body frame having side bars with their front ends in front of the front axle and their rear ends in front of the rear axle, the partially elliptic springs extending from said rear ends backward to the rear axle, the elliptic springs interposed between the front ends and the front axle, the engine frame, partly elliptic springs interposed between the engine frame and the rear axle, and the bars or rods connecting the engine frame to the front axle, and means for flexibly connecting together the two frames, substantially as set forth.

19. In a vehicle of the class described, the combination of the axles, the body frame connected to the axles, the engine frame connected to the axles independently of the body frame, and the adjusting devices interposed between one of the axles and the engine frame, substantially as set forth.

20. In a vehicle of the class described, the combination of the axles, the body frame connected to the axles, the engine frame connected to one of the axles independently of said body frame, the springs interposed between the engine frame and the other axle and independent of said body frame, and the devices for flexibly connecting the engine frame to the body frame, substantially as set forth.

21. In a motor vehicle, the combination of front and rear axles, an engine frame, supporting springs interposed between the engine frame and one of said axles, a body frame connected to the axles independently of said supporting springs for the engine frame, and means connecting the engine frame with the body frame to permit either frame to rock relative to the other one around a longitudinal axis.

22. In a motor vehicle, the combination of front and rear axles, an engine frame, supporting springs interposed between the engine frame and one of said axles, a body frame connected to the axles independently of said supporting springs for the engine frame, and means pivotally connecting the engine frame with the body frame to permit either frame to rock relative to the other one around a longitudinal axis.

23. In a motor vehicle, the combination with front and rear axles, of an engine frame resiliently mounted on one of the axles, a body frame supported on said axles independently of said engine frame, and means pivotally connecting the body frame and the engine frame at points between the said axles.

24. In a motor vehicle, the combination with front and rear axles, of an engine frame, a body frame, springs independently supporting each of said frames from a common axle, and means directly connecting the said frames together to permit either frame to rock relative to the other one around a longitudinal axis.

25. In a motor vehicle, the combination with front and rear axles, of a body frame suitably supported on said axles, an engine frame spring supported from one of said axles independently of said main frame, and means connecting the engine frame with the body frame to permit either frame to rock relative to the other one around a longitudinal axis.

26. In a motor vehicle, the combination of front and rear axles, a body frame supported on said axles, an engine frame supported at one end on said rear axle and having its other end connected to the body frame to permit either frame to rock relative to the other one around a longitudinal axis, and means for adjusting said rear axle and engine frame relatively to each other.

27. In a motor vehicle, the combination of front and rear axles, a body frame supported on said axles, an engine frame supported at one end on said rear axle and having its other end connected to the body frame to permit either frame to rock relative to the other one around a longitudinal axis, and longitudinal adjusting means interposed between said rear axle and said engine frame.

28. In a motor vehicle, the combination with the main running gear frame comprising axles and body frame, of an engine frame having three-point connections with said running gear frame, one of said connections being pivotal and the other two flexible and resilient.

29. In a motor vehicle the combination of the front and rear axles, the body frame, the engine frame having two-point connections with one axle and a pivotal connection with the body frame, and a link connecting the engine frame with the other axle.

30. In a motor vehicle, the combination of the front and rear axles, a body frame, springs connecting said body frame to each of the axles, an engine frame flexibly connected at its front end to the body frame, a flat or leaf spring rigidly connected at one end to the engine frame and pivotally connected at its other end to one side of the rear axle, and a link connected to the other side of the rear axle and to the engine frame.

31. In a motor vehicle, the combination of the front and rear axles, a body frame resting on said axles, an engine frame flexibly connected to the body frame independently of the axles, and means independent of the body frame flexibly connecting the engine frame to the rear axles.

32. In a motor vehicle, the combination of the front and rear axles, a body frame resting on said axles, an engine frame flexibly connected to the body frame independently of the axles, and resilient means independent of the body frame connecting the engine frame to the rear axle.

33. In a motor vehicle, the combination of the front and rear axles, a body frame resting on said axles, an engine frame pivotally connected to the body frame on an axis longitudinal thereof and also connected to the said rear axle, and means comprising a flexible link connecting the engine frame to the front axle so as to permit the latter to rise and fall independently of the engine frame.

34. In a motor vehicle, the combination of the front and rear axles, an engine frame disposed between the axles, means connecting one end of the engine frame to the body frame so as to permit the former to vibrate on an axis longitudinal of the body frame, resilient means for supporting the other end of the engine frame from one of the axles, and flexible links interposed between the engine frame and the front and rear axles respectively.

In testimony whereof I affix my signature in presence of two witnesses.

JOHN B. BARTHOLOMEW.

Witnesses:
　Lee W. Hazard,
　Annie C. Eyster.